United States Patent
Gourde et al.

(10) Patent No.: US 8,361,547 B2
(45) Date of Patent: Jan. 29, 2013

(54) PROCESS OF DECORATING A TRANSPARENT OR TRANSLUCENT BOTTLE

(75) Inventors: Armel Gourde, Gamaches (FR); Jonathan Clark, Le Titre (FR)

(73) Assignee: Verreries du Courval, Senarpont (FR)

( * ) Notice: Subject to any disclaimer, the term of this patent is extended or adjusted under 35 U.S.C. 154(b) by 574 days.

(21) Appl. No.: 12/485,791

(22) Filed: Jun. 16, 2009

(65) Prior Publication Data

US 2009/0311452 A1     Dec. 17, 2009

(30) Foreign Application Priority Data

Jun. 16, 2008 (FR) ...................... 08 03351
Dec. 15, 2008 (FR) ...................... 08 07039

(51) Int. Cl.
*B05D 5/00* (2006.01)
*B05D 7/22* (2006.01)
*B05D 1/02* (2006.01)

(52) U.S. Cl. ...................... 427/236; 427/419.2; 427/427

(58) Field of Classification Search .................. 427/230, 427/236, 237, 421.1, 427, 374.1, 419.1–419.4
See application file for complete search history.

(56) References Cited

U.S. PATENT DOCUMENTS

2004/0199138 A1  10/2004  McBay et al.
2005/0199571 A1   9/2005  Geisler et al.

FOREIGN PATENT DOCUMENTS

| EP | 1552764 A1 * | 1/2004 |
| EP | 1 552 764 | 7/2005 |
| FR | 2 851 940 | 9/2004 |
| FR | 2 889 485 | 2/2007 |
| FR | 2889485 A1 * | 9/2007 |
| WO | WO 03/007868 | 1/2003 |

OTHER PUBLICATIONS

Schottner et al., "Décoration d'objets en cristal avec des revêtements sol-gel hybrids," Revue VERRE, vol. 6, No. 5. Oct. 2000. 5 pgs.*
INPI (French Patent Office) Search Report and Written Opinion dated May 14, 2009 in French Patent Application No. 0807039 (FR language).
English language Abstract for EP 1 552 764.
English language Abstract for FR 2 851 940.
English language Abstract for FR 2 889 485.

* cited by examiner

*Primary Examiner* — William Phillip Fletcher, III
(74) *Attorney, Agent, or Firm* — Hershkovitz & Associates LLC; Abraham Hershkovitz

(57) ABSTRACT

A method for decorating a glass or plastic transparent or translucent bottle, for the cosmetic field, for containing a cosmetic product such as a perfume, or the like, the decoration of which is carried out inside the bottle, and which consists in making at least one coating onto the inner surface of the bottle, by spraying a liquid mist inside the bottle, characterized in that the liquid is chemically inert with a characteristic close to glass so that the inner coating forms a barrier protecting layer for protecting the cosmetic product from any possible migration detrimental to the fragrance and/or color as wells as the preservation thereof.

13 Claims, No Drawings

PROCESS OF DECORATING A TRANSPARENT OR TRANSLUCENT BOTTLE

The present invention relates to a method for decorating a transparent or translucent, glass or plastics bottle, for the cosmetic field, by making an inner coating in order to make a decoration inside the bottle. Said inner coating is such that the contents of the bottle, that is a perfume, a cream or the like, are protected from any possible migration detrimental to the quality thereof, as for example detrimental to the fragrance and/or colour as well as preservation thereof.

Currently, the aesthetics of such products is a crucial factor for the buyers to make their choice. Moreover, regardless of the field they are working in, manufacturers seek to give the best possible aesthetics to their products, so as to cause a purchasing reflex by the consumers.

Fashion, jewelry, cosmetics and perfumery are of course quite affected by the aesthetics of products, in particular the packaging, and everyone has been able to note that, in particular the perfumers, seek to appeal customers with bottles different from those of the competition by providing their perfume within bottles having increasingly aesthetic and original shapes and decorations.

Methods for decorating a transparent or translucent bottle are already known, wherein the decoration is made inside the bottle, by using a colour lacquer that is sprayed inside the bottle. This method is disclosed for example by patent FR2851940. By using this method, it is possible to make an inner decoration including, for example, a single decorating coating layer, optionally multiple layers. The lacquers used are liquid epoxy or polyurethane lacquers, or lacquers made by using a solvent-free powder of the epoxy, polyurethane, polyester, or even polyethylene type, and derivatives thereof. However, this decoration type, even if it enables magnificent decorations to be made, is problematic in that most perfumes likely to fill thus decorated bottles, may have an incompatibility with the chemical nature of the decorating layer(s) that can pollute and degrade these perfumes. A solution to this problem is that of depositing, in a final step, a layer capable of acting as a barrier to the migration of the harmful ingredients from the lacquer layers towards the perfume.

From patent application FR2889485, a method is also known wherein the inner decorating layer(s) is (are) an enamelled layer. However, the drawback of this kind of method is that a baking is required by heating at high temperature, for example 800° C., which makes the method costly and unusable for plastics bottles.

By bottle, it is meant any packaging type for cosmetic products such as perfume, cologne, cream and the like.

The invention provides a novel decorating method enabling a bottle to be decorated from the inside, which enables a particularly elegant decoration to be obtained and the cosmetic product therein to be protected from aggressions thanks to a layer acting as a barrier by isolating said product, said bottle being optionally of glass or plastics.

According to the method of the invention, the decoration is made inside the bottle, so as to cover the inner surface with a decoration, made of an inner coating contacting the cosmetic product. According to the decorating method, at least one decorating layer is made knowing that, as will be seen below, the decoration can be made with several coating layers, wherein the layer permanently contacting the perfume is the inert inner layer. The latter has properties close to those of glass.

Thus, the method for decorating a transparent or translucent glass or plastics bottle for the cosmetic field, for containing a liquid such as a perfume, or the like, according to the invention, is characterised in that the decoration is made inside the bottle, by making at least one inner decorating layer through spraying. Being chemically inert and with characteristic close to glass, this layer enables the perfume to be isolated.

According to the invention, the inert inner layer contacting the perfume, deposited inside, is an inorganic silica- and pigment-based product, and is advantageously an inorganic polymer made by the "SOLGEL" method. The thus deposited layer is an inert polymer with characteristics close to glass.

The decorating layer forming the inner coating is made by spraying inside the bottle a liquid, whether coloured or not, directly onto the glass (or plastics in the case of a plastics bottle), by using a low pressure air gun having an extension which can be introduced inside the bottle, carrying a spraying nozzle at its end. Upon spraying, the nozzle and the bottle are moved relatively to each another in order to deposit a homogeneous layer. Thus, the spraying nozzle can be moved vertically while rotating about itself. Nevertheless, the nozzle can also be moved vertically and the bottle can be rotated about the axis formed by the nozzle. However, the bottle could also be moved, by being moved vertically and being rotated with respect to the spraying nozzle.

The inner spraying is made on a hot bottle, accordingly in a step preceding the spraying step, the bottle is heated. The heating can be made, for example, through hot air or passing through an oven, so as to bring the bottle to a temperature of about 40 to 50° C.

Note that the spraying made by using the spraying nozzle introduced into the bottle through the neck thereof, is such that the nozzle provided at the end of a spraying tube, is advantageously made of a centre pipe including a set of radial holes connected to a tank containing the product to be sprayed. Of course, the spraying nozzle can have any other construction.

Therefore, the spraying is made with a liquid at room temperature in a hot bottle. In a further step following the spraying step, a drying and a cooling are carried out.

It is understood that the liquid is sprayed in bottle heated prior to its spraying in order to improve the bonding between the decorating layer and the inner surface of the bottle.

According to the method of the invention, one or more preliminary decorating layers can, for example, prior to the layer previously defined, be made, this or these layer(s) being then sandwiched in between the final decorating layer and the inner wall of the bottle.

Thus, and for example, a liquid or powder of a first colour (C1) can be sprayed to form a first colour decorating layer having the first colour (C1). Then, in a intermediate step, the layer can be destroyed in determined areas through, for example, a laser method. In this operation of destroying the layer, a colourless marking can be made, and then a liquid or a powder of a second colour (C2) is sprayed into the bottle, to make a second decorating layer having the second colour. The second layer will only be visible from the outside in areas where the first layer of the first colour has been destroyed. Therefore, decorations of different colours can be made, through the method, or the inner decorating layer(s) can be destroyed, for example through laser, to leave a decoration-free area, in order to make the level of the bottle contents visible. Then, the inert final layer is applied, which final layer is permanently contacting the contents, in order to ensure no migration will occur over the time of chemicals or colorants contained in the decorating layer and the product contained in the bottle.

Furthermore, the method also enables an inner decoration to be made with, for example, three layers of different colours, and depending on these layers, it will be possible to destroy only the first layer for the second layer to appear in these destroyed areas, whereas the first two layers could be destroyed in other areas, for the third layer to appear, because the laser only destroys the lacquer layers with pigments.

According to another embodiment, an inner decoration is made by more than two layers of different colours and only the first layer is destroyed for the second layer to appear in the destroyed areas, whereas the first two layers are destroyed in other areas for the third layer to appear.

The invention also relates to the bottle decorated according to the method of the invention, which is characterised in that it includes an inner decoration, whereas it is advantageously of glass, but can be of plastics such as, for example, thermoplastic polyesters (PET, PET-A, PET-G, . . . ), polymethylmethacrylate (PMMA), polyolefine such as polyethylene (PE or PE-HD high density polyethylene), or polypropylene (PP), polystyrene (PS) or acrylic or even hybrid material such as, for example, a material marketed under the trade mark Surlyn® or Abcite®.

The inner coating layer acting as a barrier against the deterioration of the bottle content, is inorganic, and as previously seen, is advantageously obtained and for example by the so-called SOLGEL method, the product includes a silica matrix (from 50 to 95%, preferably 90%) and minerals such as Zircon, Titan, or a mixture thereof. The pigments added to the silica matrix are, for example, colour pigments for colouring the inner layer. These pigments have, for example, a mixture of metal oxides such as bismuth oxide, zinc oxide, tin, copper, chromium, sodium oxide, and alumina. The pigments for colouring the layer are also, and for example, cobalt aluminate, carbon black or even graphite. The pigments are either inorganic pigments or organic pigments that are trapped into the silica-based matrix of the layer, and therefore said pigments cannot migrate into the bottle contents.

The liquid sprayed, to make the inner layer contacting the bottle contents, is an inorganic polymer, which by using the SOLGEL method, is obtained by simple chemical reactions and at a temperature close to room temperature (20 to 150° C.). The synthesis is made from alcoholates (a liquid coming from alcohol distillation on aromatic substrates), silicon and an alkyl organic group (hydrocarbons derived molecules (alkanes) having only single covalent bonds). The base reactions are carried out at about room temperature, therefore it is possible to associate organic portions with the inorganic portion without the former to undergo a subsequent thermal degradation. This consists in dissolving the organic portion in the synthesis solvent. The inorganic gel is then formed by taking into account the presence of the invited molecules. A restriction to this approach is the low proportion of organics inserted into the inorganic network. The second possibility is that of using precursors including both hydrolysable functions that generate the silicated network and organic functions that remain grafted onto the inorganic backbone. These organic linkages are bonded to the silicon via a Si—C bond that is hydrolysis-proof. Depending on its nature, the organic portion can act as a former or a modifier by analogy with glass formers or modifiers made at high temperatures.

Of course, the invention is not restricted to the described embodiments, but it also includes all the technical equivalents as well as combinations thereof.

The invention claimed is:

1. A method for decorating a glass or plastic transparent or translucent bottle, for the cosmetic field, for containing a cosmetic product, a decoration of which is made inside the bottle, and which comprises:
   applying at least one coating on an inner surface of the bottle by spraying a liquid inside the bottle,
   wherein the sprayed liquid is a silica-based polymer,
   said liquid being chemically inert so that the coating forms a barrier layer protecting the cosmetic product from any migration detrimental to quality of the fragrance and/or colour thereof as well as preserving the cosmetic product.

2. The method for decorating a bottle according to claim 1, wherein pigments are added to the polymer.

3. The method for decorating a bottle according to claim 2, wherein the polymer is made by a "SOLGEL" method.

4. The method for decorating a bottle according to claim 2, wherein the pigments are colour pigments.

5. The method according to claim 4, wherein the colour pigments are inorganic pigments.

6. The method according to claim 4, wherein the colour pigments are organic pigments.

7. The method according to claim 1, wherein the spraying of the liquid to form the coating is done at room temperature into the bottle while hot and wherein, in a step preceding the spraying step, the bottle is heated.

8. The method according to claim 7, wherein, following the spraying, a drying and then a cooling are carried out.

9. The method according to claim 1, wherein, prior to spraying the liquid, one or more decorating layers are made, being sandwiched between a final decorating layer and the inner surface of the bottle.

10. The method according to claim 9, wherein at least one of the one or more decorating layers is lacquer.

11. The method according to claim 10, wherein the lacquer includes pigments.

12. The method according to claim 1, wherein the coating includes at least one mineral selected from zirconium and titanium.

13. The method according to claim 1, wherein the liquid is sprayed directly on the inner surface of the glass or the plastic bottle.

* * * * *